(12) United States Patent
Kuhn et al.

(10) Patent No.: US 10,472,881 B2
(45) Date of Patent: Nov. 12, 2019

(54) SUBSTRATE PROVIDED WITH A STACK HAVING THERMAL PROPERTIES AND A SUPERSTOICHIOMETRIC INTERMEDIATE LAYER

(71) Applicant: SAINT-GOBAIN GLASS FRANCE, Courbevoie (FR)

(72) Inventors: Bertrand Kuhn, Paris (FR); Nicolas Mercadier, Paris (FR); Benoit Georges, Abu Dhabi (AE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 232 days.

(21) Appl. No.: 15/515,354

(22) PCT Filed: Sep. 29, 2015

(86) PCT No.: PCT/FR2015/052587
§ 371 (c)(1),
(2) Date: Mar. 29, 2017

(87) PCT Pub. No.: WO2016/051066
PCT Pub. Date: Apr. 7, 2016

(65) Prior Publication Data
US 2017/0218685 A1    Aug. 3, 2017

(30) Foreign Application Priority Data
Sep. 30, 2014    (FR) ...................... 14 59255

(51) Int. Cl.
*E06B 3/67*    (2006.01)
*C03C 17/36*    (2006.01)
(Continued)

(52) U.S. Cl.
CPC ............ *E06B 3/6715* (2013.01); *C03C 17/36* (2013.01); *C03C 17/366* (2013.01);
(Continued)

(58) Field of Classification Search
CPC ............... E06B 3/6715; C03C 17/3626; C03C 17/3644; C03C 17/3652; C03C 17/366;
(Continued)

(56) References Cited

U.S. PATENT DOCUMENTS 5,962,115 A * 10/1999 Zmelty .................. C03C 17/36
428/216
2003/0150711 A1    8/2003 Laird
(Continued)

FOREIGN PATENT DOCUMENTS

WO    WO 03/010105 A1    2/2003
WO    WO 03/033427 A1    4/2003
(Continued)

OTHER PUBLICATIONS

International Search Report dated Jan. 26, 2016, in PCT/FR2015/052587 filed Sep. 29, 2015.

*Primary Examiner* — Donald J Loney
(74) *Attorney, Agent, or Firm* — Oblon, McClelland, Maier & Neustadt, L.L.P.

(57) ABSTRACT

A substrate is coated on one face with a thin-films stack having reflection properties in the infrared and/or in solar radiation including a single metallic functional layer, based on silver or on a metal alloy containing silver, and two antireflection coatings. The coatings each include at least one dielectric layer. The functional layer is positioned between the two antireflection coatings. At least one of the antireflection coatings includes an intermediate layer including zinc oxide $Zn_1O_{1+x}$ with $0.05<x<0.3$ and having a physical thickness of between 0.5 nm and 20 nm, or between 2.5 nm and 10 nm.

20 Claims, 1 Drawing Sheet

Figure 1:
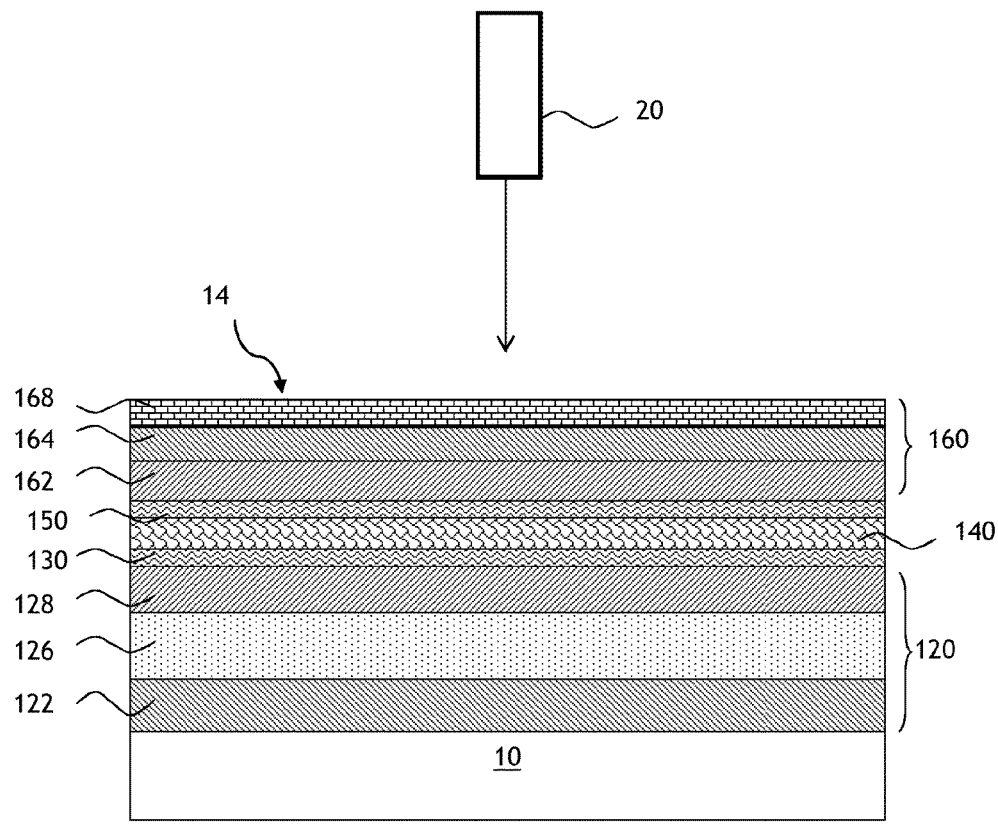

(51) Int. Cl.
*E06B 3/673* (2006.01)
*C03C 17/34* (2006.01)

(52) U.S. Cl.
CPC ...... *C03C 17/3626* (2013.01); *C03C 17/3644* (2013.01); *C03C 17/3652* (2013.01); *C03C 17/3681* (2013.01); *C03C 17/3423* (2013.01); *C03C 2217/212* (2013.01); *C03C 2217/216* (2013.01); *C03C 2217/256* (2013.01); *C03C 2217/281* (2013.01); *C03C 2217/73* (2013.01); *C03C 2218/154* (2013.01); *E06B 3/673* (2013.01); *Y02B 80/22* (2013.01)

(58) Field of Classification Search
CPC ............ C03C 17/3681; C03C 17/3423; C03C 2217/216; C03C 2217/281; C03C 2217/256; C03C 2217/73; Y02B 80/22; Y02B 80/24
See application file for complete search history.

(56) References Cited

U.S. PATENT DOCUMENTS

| | | |
|---|---|---|
| 2004/0241406 A1 | 12/2004 | Nadaud et al. |
| 2005/0025917 A1 | 2/2005 | Laird et al. |
| 2005/0164015 A1 | 7/2005 | Laird et al. |
| 2006/0222863 A1 | 10/2006 | Nadaud et al. |
| 2011/0070417 A1 | 3/2011 | Reutler et al. |
| 2011/0284366 A1 | 11/2011 | Laird et al. |
| 2012/0028009 A1 | 2/2012 | Gerardin et al. |
| 2013/0323514 A1 | 12/2013 | Laird et al. |

FOREIGN PATENT DOCUMENTS

| | | |
|---|---|---|
| WO | WO 2009/122090 A2 | 10/2009 |
| WO | WO 2010/103224 A1 | 9/2010 |

\* cited by examiner

SUBSTRATE PROVIDED WITH A STACK HAVING THERMAL PROPERTIES AND A SUPERSTOICHIOMETRIC INTERMEDIATE LAYER

CROSS-REFERENCE TO RELATED APPLICATION

The present application is a national stage application of International Patent Application No. PCT/FR2015/052587, filed Sep. 29, 2015, which claims priority to French Patent Application No. 1459255, filed Sep. 30, 2014, the entire contents and disclosure of each of which is incorporated herein by reference.

The invention relates to a multiple glazing comprising at least two substrates, of the glass substrate type, which are held together by a frame structure, said glazing providing a separation between an external space and an internal space, wherein at least one intermediate gas-filled space is positioned between the two substrates.

In a known manner, one of the substrates may be coated on an inner face in contact with the intermediate gas-filled space with a thin-films stack having reflection properties in the infrared and/or in solar radiation comprising a single metallic functional layer, in particular based on silver or on a metal alloy containing silver, and two antireflection coatings, said coatings each comprising at least one dielectric layer, said functional layer being positioned between the two antireflection coatings.

The invention relates more particularly to the use of such substrates for manufacturing thermal insulation and/or solar protection glazing. This glazing may be intended for equipping buildings, especially with a view to reducing air-conditioning load and/or preventing excessive overheating (called "solar control" glazing) and/or reducing the amount of energy dissipated to the outside (called "low-emissivity" glazing) driven by the ever increasing size of glazed surfaces in buildings.

This glazing may furthermore be integrated into glazing having particular functionalities, such as for example heated glazing or electrochromic glazing.

One type of stack known for giving substrates such properties comprises a metallic functional layer having reflection properties in the infrared and/or in solar radiation, in particular a metallic functional layer, based on silver or on a metal alloy containing silver.

In this type of stack, the functional layer is thus positioned between two antireflection coatings each comprising, in general, several layers which are each made of a dielectric material of the nitride type, and in particular silicon nitride or alumina nitride, or of the oxide type. From an optical point of view, the purpose of these coatings which flank the metallic functional layer is to "antireflect" this metallic functional layer.

A blocker coating is however inserted sometimes between one or each antireflection coating and the metallic functional layer; the blacker coating positioned beneath the functional layer in the direction of the substrate protects it during an optional high-temperature heat treatment, of the bending and/or tempering type, and the blocker coating positioned on the functional layer on the opposite side from the substrate protects this layer from any degradation during the deposition of the upper dielectric coating and during an optional high-temperature heat treatment, of the bending and tempering type.

The invention relates more particularly to the use of an intermediate layer within the stack, and to the implementation of a treatment of the complete thin-films stack using a source that produces radiation, and in particular infrared radiation.

It is known, in particular from international patent application WO 2010/142926, to provide an absorbent intermediate layer of a stack and to apply a treatment after the deposition of a stack in order to reduce the emissivity, or to improve the optical properties, of low-emissivity stacks. The treatment makes it possible to improve the quality of the metallic functional layer and therefore to reduce the emissivity (which is directly linked to the sheet resistance) and the use of an absorbent intermediate layer makes it possible to increase the absorption of the stack during the treatment so that it is short but effective. As the absorbent intermediate layer becomes transparent during the treatment, the optical characteristics of the stack after treatment are advantageous (a high light transmission may in particular be obtained).

However, this solution is not completely satisfactory since it is desired that the quality of the metallic functional layer be further improved and that therefore the sheet resistance be further reduced.

The objective of the invention is to succeed in overcoming the drawbacks of the prior art, by developing a novel type of stack with a single functional layer, which stack has, after treatment, an even lower sheet resistance (and therefore an even lower emissivity).

Thus, one subject of the invention is, in its broadest sense, a substrate coated on one face with a thin-films stack having reflection properties in the infrared and/or in solar radiation as claimed in claim 1. This stack comprises a single metallic functional layer, in particular based on silver or on a metal alloy containing silver, and two antireflection coatings, said coatings each comprising at least one dielectric layer, said functional layer being positioned between the two antireflection coatings.

According to the invention, at least one of said antireflection coatings comprises an intermediate layer comprising zinc oxide $Zn_1O_{1+x}$ with $0.05<x<0.3$ and having a physical thickness of between 0.5 nm and 20 nm, or between 2.5 nm and 10 nm, or else between 2.5 nm and 4 nm.

Indeed, it has been discovered that an intermediate layer based on superstoichiometric zinc oxide makes it possible to obtain, after treatment using a radiation source, an even lower sheet resistance.

The term "coating" should be understood in the present invention to mean that there may be a single layer or several layers of different materials within the coating.

As is customary, the term "dielectric layer" should be understood in the present invention to mean that, from the point of view of its nature, the material of the layer is "nonmetallic", i.e. is not a metal. In the context of the invention, this term denotes a material having an n/k ratio over the entire visible wavelength range (from 380 nm to 780 nm) equal to or greater than 5.

The refractive index values indicated in the present document are the values measured as is customary at the wavelength of 550 nm.

The expression "layer based on . . . " should be understood in the present invention to mean that the layer comprises the material mentioned at more than 50 at %.

Said intermediate layer preferably comprises zinc oxide $Zn_1O_{1+x}$ with $0.1<x<0.3$, or else with $0.15<x<0.25$.

In one particular version, said intermediate layer consists of zinc oxide $Zn_1O_{1+x}$ and does not comprise any other element.

In one particular version of the invention, said intermediate layer is located in the antireflection coating superjacent to the functional layer, preferably directly on an overblocker coating located directly on said functional layer, considered starting from the substrate.

It is particularly surprising that an intermediate layer located in the antireflection coating superjacent to the functional layer can have a beneficial effect on the quality of this functional layer, and thus on the sheet resistance of the stack, since this functional layer is located underneath in the direction of the substrate.

In another particular version of the invention, said intermediate layer is located in said dielectric coating positioned beneath said metallic functional layer, preferably directly underneath said functional layer.

Irrespective of the version above, said intermediate layer is located, preferably, on another face, directly in contact with a nitride-based dielectric layer having a physical thickness of between 10 and 50 nm, this layer being preferably based on silicon nitride $Si_3N_4$.

Said antireflection coating positioned beneath said metallic functional layer preferably comprises a high-index layer made of a material having a refractive index between 2.3 and 2.7, this layer being preferably based on oxide.

This high-index layer makes it possible to maximize the high light transmission of the stack in the visible and has a favorable action on obtaining neutral colors, both in transmission and in reflection.

This high-index layer preferably has a physical thickness of between 5 and 25 nm.

In another particular version of the invention, the last layer of the subjacent dielectric coating, the one furthest from the substrate, is based on oxide, deposited preferably substoichiometrically, and in particular is based on titanium oxide ($TiO_x$).

The stack may thus comprise a final layer ("overcoat"), i.e. a protective layer, deposited preferably substoichiometrically. This layer is oxidized for the most part stoichiometrically in the stack after the deposition.

It is also possible to make provision for the use of a layer according to the invention comprising zinc oxide $Zn_1O_{1+x}$ with $0.05<x<0.3$ and having a physical thickness of between 0.5 nm and 20 nm, or else between 2.5 nm and 10 nm, or even between 2.5 nm and 4 nm as intermediate layer in an antireflection coating of thin-films stack having a single functional layer.

The invention also relates to a process for obtaining a substrate coated on one face with a thin-films stack having reflection properties in the infrared and/or in solar radiation comprising a single metallic functional layer, in particular based on silver or on a metal alloy containing silver, and two antireflection coatings, comprising the following steps, in the order:

the deposition on one face of said substrate of a thin-films stack having reflection properties in the infrared and/or in solar radiation according to the invention comprising a single metallic functional layer, in particular based on silver or on a metal alloy containing silver, and two antireflection coatings, then the treatment of said thin-films stack using a source that produces radiation and in particular infrared radiation.

The invention also relates to a multiple glazing comprising at least two substrates which are held together by a frame structure, said glazing providing a separation between an external space and an internal space, wherein at least one intermediate gas-filled space is positioned between the two substrates, one substrate being according to the invention.

Preferably, a single substrate of the multiple glazing comprising at least two substrates or of the multiple glazing comprising at least three substrates is coated on an inner face in contact with the intermediate gas-filled space with a thin-films stack having reflection properties in the infrared and/or in solar radiation according to the invention.

The glazing according to the invention incorporates at least the substrate bearing the stack according to the invention, optionally combined with at least one other substrate. Each substrate may be clear or tinted. One of the substrates at least may in particular be made of bulk-tinted glass. The choice of coloration type will depend on the level of light transmission and/or on the colorimetric appearance that is/are desired for the glazing once its manufacture has been completed.

The glazing according to the invention may have a laminated structure, in particular combining at least two rigid substrates of glass type with at least one sheet of thermoplastic polymer, in order to have a structure of the following type: glass/thin-films stack/sheet(s)/glass/intermediate gas-filled space/glass sheet. The polymer may in particular be based on polyvinyl butyral PVB, ethylene/vinyl acetate EVA, polyethylene terephthalate PET or polyvinyl chloride PVC.

Advantageously, the present invention thus makes it possible to produce a thin-films stack with a single functional layer having, deposited on a transparent substrate, an even lower sheet resistance after treatment using a radiation source.

Advantageously, the treatment with a source of radiation is not a high-temperature heat treatment of the entire assembly consisting of the substrate and the stack; the substrate is not therefore heat-treated by this treatment using a source of radiation (no bending, tempering or annealing).

Figure 2:
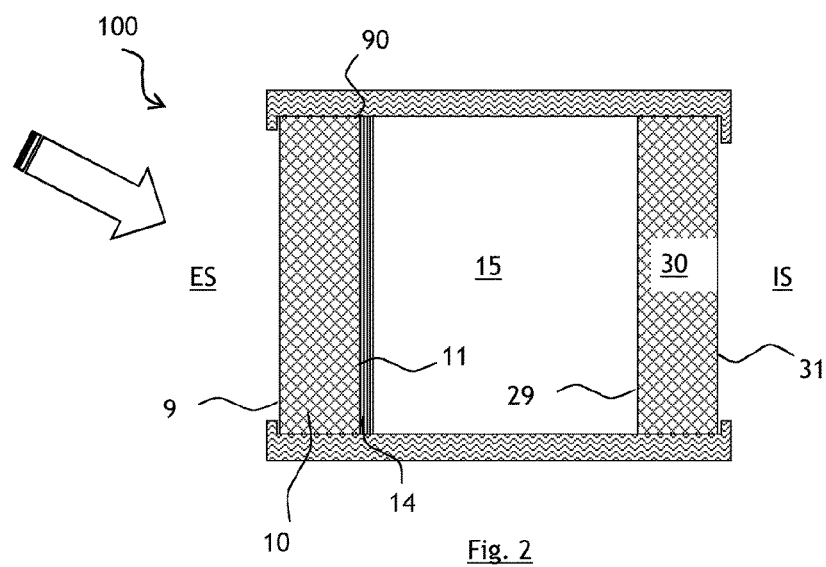

The details and advantageous features of the invention will emerge from the following nonlimiting examples, illustrated by means of the appended figures that illustrate:

in FIG. 1, a stack with a single functional layer according to the invention, the functional layer being deposited directly on an underblocker coating and directly beneath an overblocker coating, the stack being illustrated during the treatment using a source that produces radiation; and in FIG. 2, a double glazing solution incorporating a stack with a single functional layer.

In these figures, the proportions between the thicknesses of the various layers or of the various elements are not rigorously respected in order to make them easier to examine.

FIG. 1 illustrates a structure of a stack with a single functional layer of the prior art deposited on a transparent glass substrate 10, in which the single functional layer 140, in particular based on silver or on a metal alloy containing silver, is positioned between two dielectric coatings, the subjacent dielectric coating 120 located underneath the functional layer 140 in the direction of the substrate 10 and the superjacent dielectric coating 160 positioned on top of the functional layer 140 on the opposite side from the substrate 10.

These two dielectric coatings 120, 160, each comprise at least two dielectric layers 122, 126, 128; 162, 164.

Optionally, on the one hand the functional layer 140 may be deposited directly on an underblocker coating 130 positioned between the subjacent dielectric coating 120 and the functional layer 140 and, on the other hand, the functional layer 140 may be deposited directly beneath an overblocker coating 150 positioned between the functional layer 140 and the superjacent dielectric coating 160.

The underblocker and/or overblocker layers, although deposited in metallic form and presented as being metallic layers, are sometimes in practice oxidized layers since one of their functions, (in particular for the overblocker layer) is to oxidize during the deposition of the stack in order to protect the functional layer.

This dielectric coating 160 may be terminated by an optional protective layer 168, in particular based on oxide, especially substoichiometric in oxygen.

When a stack with a single functional layer is used in a multiple glazing 100 of double glazing structure, as illustrated in FIG. 2, this glazing comprises two substrates 10, 30 which are held together by a frame structure 90 and which are separated from one another by an intermediate gas-filled space 15.

The glazing thus provides a separation between an external space ES and an internal space IS.

The stack may be positioned on face 2 (on the sheet furthest to the outside of the building when considering the incident direction of the sunlight entering the building and on its face turned toward the gas-filled space).

FIG. 2 illustrates this positioning (the incident direction of the sunlight entering the building being illustrated by the double arrow) on face 2 of a thin-film stack 14 positioned on an inner face 11 of the substrate 10 in contact with the intermediate gas-filled space 15, the other face 9 of the substrate 10 being in contact with the external space ES.

However, it may also be envisaged that in this double glazing structure, one of the substrates has a laminated structure.

Three examples were carried out numbered 1 to 3.

For these three examples, the antireflection coating 120 subjacent to the functional layer 140 comprises three antireflection layers 122, 124, 128, the layer 122, first layer of the stack and in contact with the face 11, is a layer having an average refractive index; it is made of the nitride $Si_3N_4$:Al and is deposited from a metallic target doped with 8% by weight of aluminum. The first antireflection layer 122 has an average index; It has a refractive index of between 1.9 and 2.1, and which here is precisely 2.0.

The second antireflection layer of the antireflection coating 120, the layer 124 has a high refractive index. It is based on titanium oxide; it has a refractive index of between 2.3 and 2.7, and which here is precisely 2.46.

The third antireflection layer of the antireflection coating 120 is a wetting layer 128 positioned just beneath the metallic functional layer 140.

In the examples, there is no underblocker coating 130.

For these examples, the antireflection layer 128 is referred to as a "wetting layer" since it makes it possible to improve the crystallization of the metallic functional layer 140 which here is made of silver, which improves its conductivity. This antireflection layer 128 is made of aluminum-doped zinc oxide ZnO:Al (deposited from a metallic target consisting of zinc doped with 2% by weight of aluminum).

The superjacent antireflection coating 160 comprises:

a dielectric layer 162 made of aluminum-doped zinc oxide ZnO:Al (deposited from a metallic target consisting of zinc doped with 2% by weight of aluminum), a layer made of silicon nitride $Si_3N_4$:Al, the layer 164, deposited from a metallic target doped with 8% by weight of aluminum, and an oxide-based protective layer 168.

For all the examples below, the conditions for depositing the layers are:

| Layer | Target used | Deposition pressure | Gas |
|---|---|---|---|
| $Si_3N_4$:Al | Si:Al at 92:8 wt % | $1.5 \times 10^{-3}$ mbar | $Ar/(Ar + N_2)$ at 45% |
| $TiO_z$ | $TiO_x$ | $2 \times 10^{-3}$ mbar | $Ar/(Ar + O_2)$ at 90% |
| Ti | Ti | $7 \times 10^{-3}$ mbar | Ar at 100% |
| ZnO:Al | Zn:Al at 98:2 wt % | $2 \times 10^{-3}$ mbar | $Ar/(Ar + O_2)$ at 52% except for layer 162 of ex. 2 and 3 |
| NiCr | NiCr at 80:20 wt | $2 \times 10^{-3}$ mbar | Ar at 100% |
| Ag | Ag | $2 \times 10^{-3}$ mbar | Ar at 100% |

The layers deposited may thus be classed into three categories:

i—layers made of dielectric material, having an n/k ratio over the entire visible wavelength range of greater than 5: $Si_3N_4$:Al, $TiO_2$, ZnO:Al ii—metallic functional layers made of material having reflection properties in the infrared and/or in solar radiation: Ag iii—overblocker and underblocker layers intended to protect the functional layer against a modification of its nature during the deposition of the stack; their influence on the optical and energy properties is in general ignored.

It was observed that the silver also has a ratio 0<n/k<5 over the entire visible wavelength range, but its bulk electrical resistivity is less than $10^{-6}$ Ω·cm.

In all the examples below, the thin-films stack is deposited on a substrate made of clear soda-lime glass having a thickness of 4 mm of the Planilux brand, distributed by SAINT-GOBAIN.

For these stacks, R indicates the sheet resistance of the stack, measured in ohms per square.

For these examples, moreover, when the substrate bearing the stack is integrated into a double glazing, it has the structure: 4-16-4 (Ar—90%), that is to say that two glass substrates, each having a thickness of 4 mm, are separated by a gas-filled space consisting of 90% argon and 10% air having a thickness of 16 mm.

All these examples made it possible to achieve, in this double glazing configuration, a U value, or K value, calculated according to the EN 673 standard, of the order of 1.0 $W \cdot m^{-2} \cdot K^{-1}$ (this is the thermal transmittance through the glazing; it indicates the amount of heat passing through the substrate in steady state, per unit area and for a unit temperature difference between the face of the glazing in contact with the outside space and the face of the glazing in contact with the inside space).

The three examples were carried out according to the stack structure illustrated in FIG. 1, but without underblocker coating 130.

Table 1 below illustrates the geometric or physical thicknesses (and not the optical thicknesses) in nanometers of each of the layers of the series of examples:

TABLE 1

| Layer | Material | Thicknesses |
|---|---|---|
| 168 | $TiO_2$ | 2 |
| 164 | $Si_3N_4$:Al | 37 |
| 162 | ZnO:Al | 5 |
| 150 | Ti | 1.5 |
| 140 | Ag | 10 |
| 128 | ZnO:Al | 3 |
| 126 | $TiO_2$ | 16 |
| 122 | $Si_3N_4$:Al | 23 |

For example 1, the flow of oxygen for depositing the layer 162 is 400 sccm; this is the flow that makes it possible, under the conditions for depositing this layer, to deposit a layer having a stable stoichiometry of $Zn_1O_1$. This is the ratio of O/Zn=1 standard for this layer; example 1 therefore constitutes a counterexample of the invention.

For example 2, the flow of oxygen for depositing the layer 162 is 450 sccm; this flow makes it possible to deposit a layer having the stoichiometry of $Zn_1O_{1.125}$. The O/Zn ratio is greater than the standard ratio; the layer deposited is therefore superstoichiometric in oxygen.

For example 3, the flow of oxygen for depositing the layer 162 is 500 sccm; this flow makes it possible to deposit a layer having the stable stoichiometry of $Zn_1O_{1.25}$. The layer deposited is therefore even more superstoichiometric in oxygen than that of example 2.

Table 2 below states the sheet resistance R, in ohms/square measured for these examples 1 to 3 after the treatment of the stack.

TABLE 2

|   | Ex. 1 | Ex. 2 | Ex. 3 |
|---|-------|-------|-------|
| R | 2.91  | 2.85  | 2.79  |

Thus, with additional oxidation in the intermediate layer 162 of 12.5% (ex. 2) and of 25% (ex. 3), the sheet resistance of the stack is improved after the treatment of the stack in the sense that it decreases.

The treatment of the stack consists in passing the stack, after the deposition of all the layers, under a curtain of laser diodes, the diodes being positioned above the stack with reference to FIG. 1 and emitting in the direction of the stack. The diodes emit at the wavelength of 980 nm, each diode emitting over a length of 12 mm and a width of 50 μm. The run speed of the substrate coated with the complete stack is 7 m/minute.

It is important to note that the intermediate layer according to the invention may be deposited from a ceramic target that comprises the oxygen necessary for achieving the targeted superstoichiometry and in an oxygen-free atmosphere, or may be deposited from a ceramic target that does not comprise all the oxygen necessary for achieving the targeted superstoichiometry and in an oxygen-containing atmosphere.

The present invention is described in the preceding text by way of example. It will be understood that a person skilled in the art will be able to realize different variants of the invention without otherwise departing from the scope of the patent as defined by the claims.

The invention claimed is:

1. A substrate coated on one face with a thin-films stack having reflection properties in the infrared and/or in solar radiation comprising a single metallic functional layer and two antireflection coatings, said antireflection coatings each comprising at least one dielectric layer, said metallic functional layer being positioned between the two antireflection coatings, wherein at least one of said antireflection coatings further comprises a layer comprising zinc oxide $Zn_1O_{1+x}$ with 0.05<x<0.3 and having a physical thickness of between 0.5 nm and 20 nm.

2. The substrate as claimed in claim 1, wherein 0.1<x<0.3.

3. The substrate as claimed in claim 1, wherein said layer comprising zinc oxide is located in the antireflection coating superjacent to the functional layer.

4. The substrate as claimed in claim 1, wherein said layer comprising zinc oxide is located in said antireflection coating positioned beneath said metallic functional layer.

5. The substrate as claimed in claim 3, wherein said layer comprising zinc oxide is located, on another face, directly in contact with a nitride-based dielectric layer having a physical thickness of between 10 and 50 nm.

6. The substrate as claimed in claim 1, wherein said antireflection coating positioned beneath said metallic functional layer comprises a high-index layer made of a material having a refractive index between 2.3 and 2.7.

7. The substrate as claimed in claim 6, wherein said high-index layer has a physical thickness of between 5 and 25 nm.

8. A multiple glazing comprising:
at least two substrates which are held together by a frame structure, said glazing providing a separation between an external space and an internal space, wherein at least one intermediate gas-filled space is positioned between the two substrates, one of the two substrates being the substrate as claimed in claim 1.

9. A process for obtaining a substrate coated on one face with a thin-films stack having reflection properties in the infrared and/or in solar radiation comprising a single metallic functional layer and two antireflection coatings, comprising the following steps, in order:
depositing on one face of said substrate the thin-films stack having reflection properties in the infrared and/or in solar radiation comprising the single metallic functional layer and the two antireflection coatings, to form the substrate as claimed in claim 1,
treating said thin-films stack using a source that produces radiation.

10. The substrate as claimed in claim 1, wherein the single metallic functional layer is based on silver or on a metal alloy containing silver.

11. The substrate as claimed in claim 1, wherein the physical thickness of the layer comprising zinc oxide is between 2.5 nm and 10 nm.

12. The substrate as claimed in claim 1, wherein said layer comprising zinc oxide consists of zinc oxide, and wherein 0.15<x<0.25.

13. The substrate as claimed in claim 3, wherein said layer comprising zinc oxide is located directly on an overblocker coating located directly on said functional layer.

14. The substrate as claimed in claim 4, wherein said layer comprising zinc oxide is located in said antireflection coating positioned directly underneath said metallic functional layer.

15. The substrate as claimed in claim 4, wherein said layer comprising zinc oxide is located, on another face, directly in contact with a nitride-based dielectric layer having a physical thickness of between 10 and 50 nm.

16. The substrate as claimed in claim 15, wherein the nitride-based dielectric layer is based on silicon nitride $Si_3N_4$.

17. The substrate as claimed in claim 5, wherein the nitride-based dielectric layer is based on silicon nitride $Si_3N_4$.

18. The substrate as claimed in claim 6, wherein the high-index layer is based on oxide.

19. The process as claimed in claim 9, wherein the single metallic functional layer is based on silver or on a metal alloy containing silver.

20. The process as claimed in claim 9, wherein the radiation produced in the treating is infrared radiation.

\* \* \* \* \*